United States Patent Office 2,948,099
Patented Aug. 9, 1960

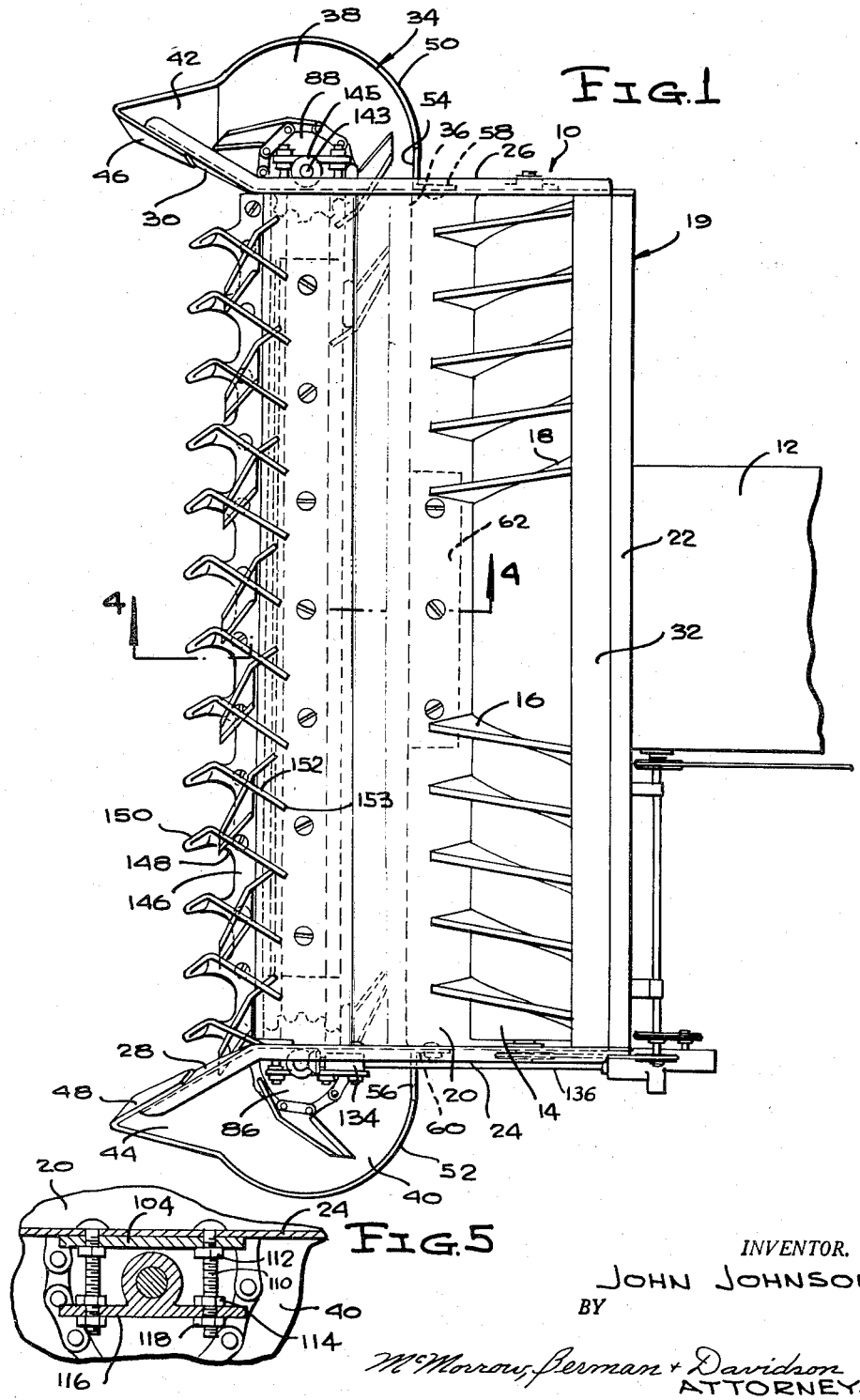

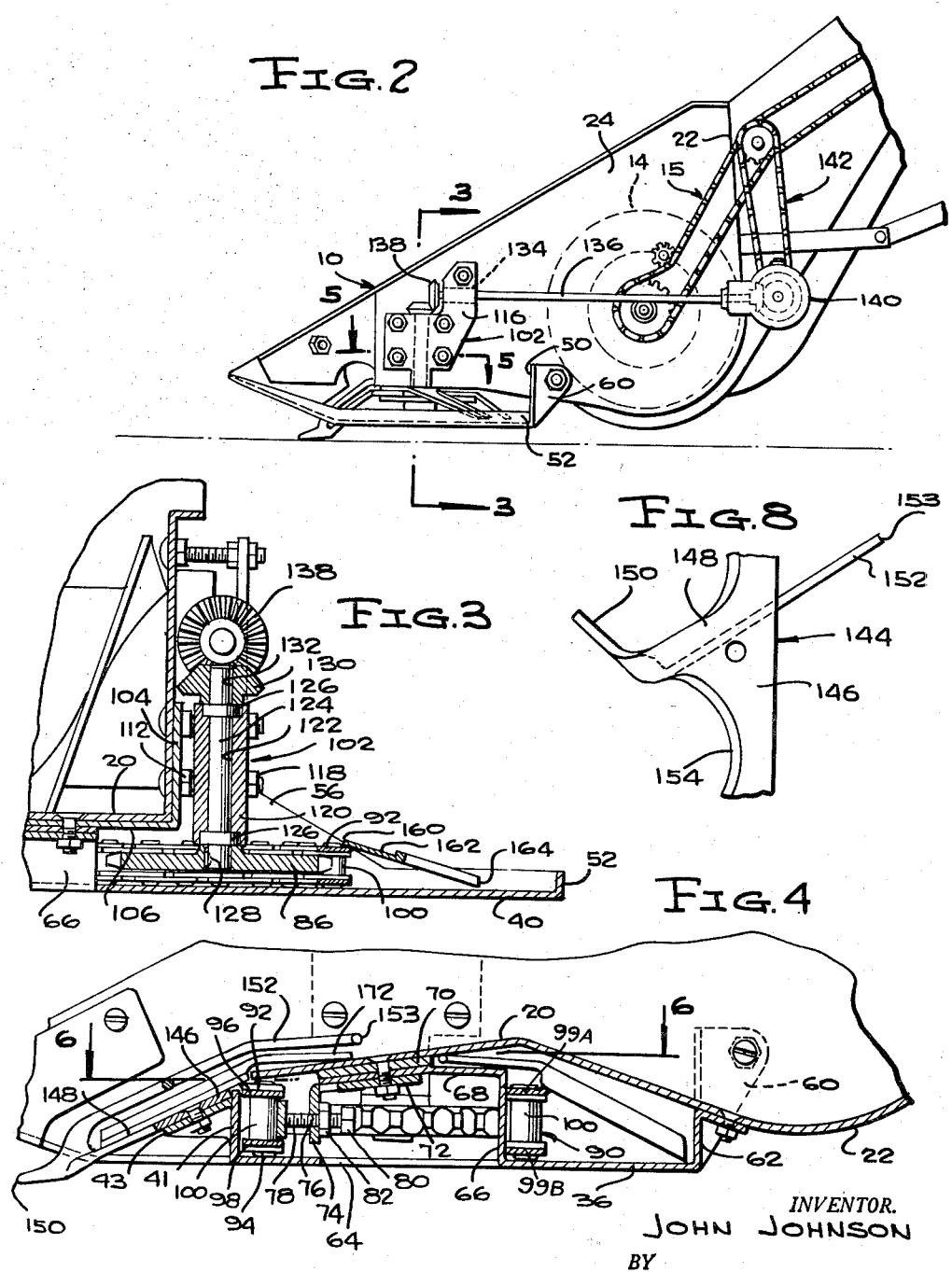

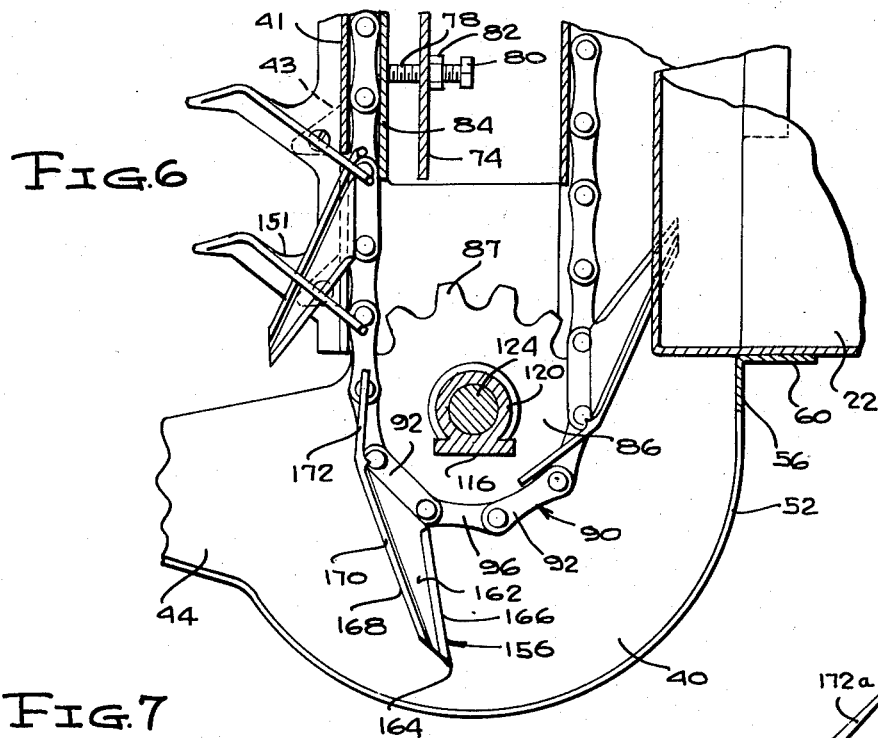
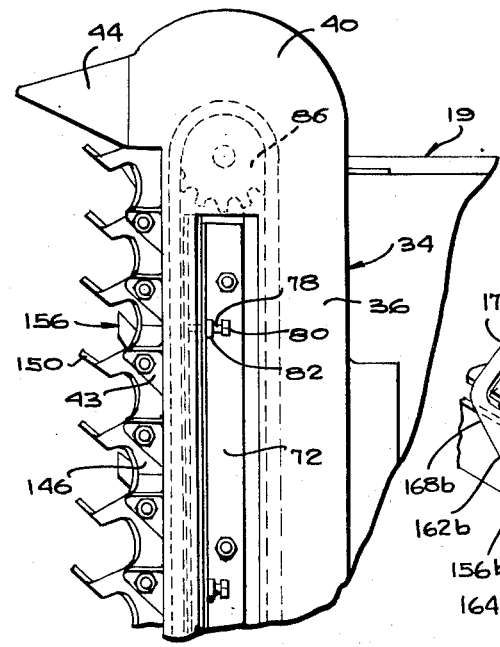
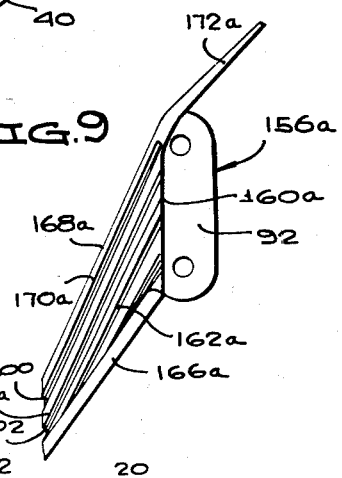

2,948,099

ENDLESS CUTTING MECHANISM

John Johnson, P.O. Box 1047, Brockton, Mont.

Filed Nov. 21, 1958, Ser. No. 775,568

3 Claims. (Cl. 56—25)

This invention pertains to an improvement in harvesting machinery, and, more specifically, to a cutting apparatus which is capable of utilization in performing a harvesting operation either alone, or in combination with presently existing types of harvesting machines.

It has heretofore been known to provide reciprocating sickle-type cutters for the platforms of harvesting machinery, and further, the platforms of these machines have been provided with Archimedes type conveying assemblies. Whenever these reciprocating cutters are used, it is necessary that a rotary reel be employed in close relationship with the ground in order to push or force the material to be cut into the cutting mechanism.

An important object, therefore, resides in the provision of a cutter assembly for a combine or the like wherein the conventional mode of use of the reel is substantially altered. In utilization of a harvesting machine employing a cutting apparatus constructed under the teachings of this invention, the setting of the reel is changed from the close relationship to the ground described above to a relatively high setting, thus tilting the longer stalks of grain or other material back toward the harvester platform. This results in an improved and speedier cutting and conveying operation.

It is another important objective of the present invention to provide an endless cutter assembly adapted for direct incorporation in newly manufactured harvesting machinery of the class described, or which may be bodily substituted for the conventional reciprocating cutter.

There have been attempts to provide harvesting machinery without the use of the reel, but these have employed air blast or vacuum devices; the present invention represents an important advance in that it is completely mechanical and hence the objectionable dust, and other disadvantages, associated with air blast or vacuum operations are avoided.

Another advantage attendant to the present construction and assembly is a reduced cost in construction and maintenance occasioned by the diminished number of parts employed and the non-complex nature of the remaining parts in comparison to the devices of the prior art.

The cutting machine here envisaged employs purely mechanical action, as stated above, and has been found to be relatively free of wear causing vibration even when operated at relatively high speeds. As will become more readily apparent in the following description of the invention, the novel construction of the cutting mechanism of this invention performs the function of gathering the stalks of grain to be cut, as well as the primary function of cutting the same.

Numerous other and further objects and advantages of this invention will become more readily apparent from the following detailed description thereof when read in conjunction with the annexed drawings, in which:

Figure 1 is a top plan view of a harvester platform including a cutting apparatus constructed and assembled in accordance with the teachings of this invention;

Figure 2 is a side elevational view of the apparatus shown in the preceding figure;

Figure 3 is an enlarged, detail cross-sectional view of the cutting assembly drive means which have been chosen for illustration in this embodiment of the invention, the section being taken substantially along the section line 3—3 of Figure 2, looking in the direction of the arrows;

Figure 4 is an enlarged detail cross-sectional view of the cutting assembly and forward part of the platform, taken substantially along the section line 4—4 of Figure 1, looking in the direction of the arrows;

Figure 5 is an enlarged fragmentary detail cross-sectional view of the structure comprising the chain wear take-up means for the cutting assembly, the figure being taken substantially along the section line 5—5 of Figure 2, looking in the direction of the arrows;

Figure 6 is an enlarged fragmentary detail cross-sectional view taken substantially on the section line 6—6 of Figure 4, looking in the direction of the arrows;

Figure 7 is a fragmentary bottom plan view of the platform and cutting assembly;

Figure 8 is an enlarged, fragmentary, bottom plan view of a section of the lower guide and cutting member of the cutting assembly;

Figure 9 is an enlarged plan view of a modified form of one of the link blade members of this invention; and Figure 10 is a perspective view of a modified form of the guide and cutting member, and of another modified form of link blade.

As stated above, this invention encompasses the concept of providing an endless chain type cutting appliance per se, and also the further concept of providing a cutting mechanism of the class described supra in the environment of a harvesting machine, although it must be clearly understood that this invention is not limited to this specific combination, but may be substituted wherever reciprocating sickles are now employed, for example, in combines, swathers, and binders. In order to properly describe the invention, the following is a description of one type of harvesting machine to which the instant cutting apparatus has application.

With special reference to Figure 1, the harvester platform or mobile support for the cutting mechanism of this invention is identified, in general, by reference numeral 10, and it will be understood that a suitable prime mover, including the usual combine and conveying equipment is conventionally secured to the machine forwardly of the feeder housing 12. The platform 10 includes the usual rotating drum 14 having rotating means 15 (see Figure 2) and having opposite hand Archimedes type conveyers 16, 18 which direct the material cut to the center of the aforesaid drum 14 from whence it is conventionally drawn into the feeder housing 12.

The parts described above are previously known to the art, but the following description includes the departures from prior art practices. The platform 10 includes a drum housing 19 having a gathering deck 20 provided with an arcuate rear wall 22, and side walls 24, 26 having outwardly flared leading ends 28, 30, respectively. It will be seen that the side walls 24, 26 and leading ends 28, 30, thereof are each provided with an outward flange, while the back wall 22 has an inwardly extending flange 32 which tends to restrict the passage of conveyed material thereover. The drum 14 is rotatably secured to the aforesaid side walls 24, 26, and connected with the drive means 15.

The cutter blade carriage assembly is identified generally by reference numeral 34 and includes a substantially rectangular base portion or main body 36 having integrally formed, rounded outer ends 38, 40 which extend outwardly beyond the side walls 24, 26 of the platform and a perpendicular front wall 41 including a series of spaced triangular projections 43 for a purpose described more fully below. The ends 38, 40 have upwardly inclined leading ends 42, 44, respectively, also integrally formed, which have lip portions 46, 48 suitably secured flush against the leading ends 28, 30 of the drum housing 19. Upwardly extending flanges 50 and 52 extend circumferentially around each of the rounded ends 38 and 40, and triangular connecting members 54, 56 having securing tabs 58, 60 respectively, are secured substantially to the center of the sides 24, 26 while an integral, elongated rear brace 62 of substantially inverted L-shape configuration has its leg portion secured to the arcuate wall 22 of the housing 19.

The base 36 is formed with a punched or struck longitudinally extending rectangular opening 64 to provide a longitudinally extending substantially rectangular flange 66 extending along one of the marginal edges of the opening, the flange being bent to provide an elongated substantially rectangular lip 68 overhanging the opening 64. With special reference to Figure 4, it will be seen that a substantially rectangular spacer plate 70 separates the lip 68 from the deck 20 of the housing 19 to which these parts are suitably secured. An elongated substantially rectangular clamp plate 72 having a depending rectangular face plate 74 is also fixedly secured to lip 68, the face plate 74 being provided with a plurality of spaced openings 76 through which extend a like plurality of cylindrical threaded screws 78 having squared heads 80 at one end thereof. Conventional hexagonal lock nuts 82 are fixedly secured to the plate 74 and the openings of the nuts are coaxially aligned with the openings 76, thus, rotation of the screws 78 will result in movement thereof longitudinally relative to the plate 74. The opposed ends of the screws 78 are positioned to bear against a substantially rectangular, elongated force applying block 84, and the block 84 is rectilinearly movable by means of the aforesaid longitudinal movement of the screws 78, the purpose of thus moving the block appearing in more detail below.

A drive sprocket 86 is suitably mounted adjacent the end 40 of the main body 36, and a freely rotatable idler sprocket 88 is mounted adjacent the end 38 thereof, both sprockets being provided with substantially triangular teeth 87 formed thereon.

An elongated, endless link chain 90 is trained around the sprocket 86, 88 for movement in a substantially horizontal plane with respect to the support 10 and comprises a plurality of pairs of spaced, substantially parallel links 92, 94 overlapping the ends of pairs of underlying links 96, 98, the overlapping ends of each of the pairs of links being provided with a connecting roller 100, the chain thus having an upper flight 99A and a lower flight 99B. In Figures 4 and 6, it will be seen that the force applying block 84 bears against the rollers 100 in order to place adjustable tension on the link chain 90.

This embodiment of the present invention illustrates and describes one method of supplying power to the drive sprocket 86. However, it will be understood that it is within the scope of this invention to provide other types of power supplying means in association therewith.

Proceeding now to a detailed description of the drive assembly chosen for this illustration, the assembly is denoted generally at 102 (see Figures 2 and 3) and is secured to the platform 10 by way of an L-shaped bracket having a leg 104 and foot 106, the leg 104 being mounted flush against the side wall 24 of the housing 19, and the foot 106 flush against the lower side of the deck 20 and secured thereto by the fastening means employed to hold the brace 72 thereto. In Figure 5, it is clearly seen that a plurality of spaced bolts, 110 extend through co-aligned openings in the wall 24 and leg 104 and have first lock nuts 112 securing them thereto. Second lock nuts 114 are spaced from the first lock nuts 112 and a polygonal bearing support plate 116 is supported on the bolts 110 and is held in spaced relationship relative to the wall 24 by means of the lock nuts 114. Third lock nuts 118 prevent the displacement of the bearing support plate 116 from its selected position. A substantially cylindrical main shaft housing 120 is integrally secured to the plate 116 and is substantially perpendicular to the main body 36. In Figure 3, it is seen that the housing 120 has an axial bore 122 with enlarged open ends and that a cylindrical drive shaft 124 is mounted for rotation therein, the shaft 124 having bearings 126 which are positioned in the aforesaid enlarged ends of the bore 122. The lower end of the shaft 124 is keyed to the sprocket 86 at 128, and the upper end of the shaft 124 is keyed to a first bevel gear 130 at 132. The bearing plate 116 has a second cylindrical housing 134 positioned at a right angle relative to the main shaft housing 120 and, with special reference to Figures 1 and 3, it is seen that an elongated cylindrical drive shaft 136 is passed therethrough for fixed connection with a second bevel gear 138 which is in mesh with the first bevel gear 130, and the other end of the shaft 136 is secured to a drive means 140 which is, in turn, connected to a remote power source through a chain drive 142.

The sprocket 88 is supported on the wall 26 of the housing 19 and is keyed to an axle 143 rotatably mounted in a housing 145 which is supported in the manner of the housing 120.

It will be noted that the method and construction employed in mounting the sprockets 86 and 88 allows the adjustment of tension on the chain 90 by the expedient of the positioning of the second lock nuts 114, and their equivalent members on the mounting of the sprocket 88, relative to the side walls 24 or 26. In other words, the greater the distance the lock nuts are positioned from the side walls, the greater will be the tension on the chain.

The cutting mechanism of the present invention includes a plurality of combined guide and cutting members are supplied and are identified by reference numeral 144, shown singly in Figure 8. The members 144 are formed as a unit as shown in Figure 6 and have a main back member 146 which is secured to the triangular projections 43 by bolts which are passed therethrough. A plurality of downwardly and outwardly inclined stationary plates 148 extend outwardly from the back member 146 and have integrally formed, pointed leading edges and end portions 150, a curvilinear cutting edge 151, and integrally formed, cylindrical guard bars 152, which extend back over the deck 20 and have free outer ends 153. In Figure 8 it is seen that the main back member 146 is provided with cutting edges 154 on its leading side and that said cutting edges extend along the downwardly and outwardly inclined plates, the purpose of which will be dealt with more fully below. It should be noted at this point, however, that the downward inclination of the plate 148 and leading edges 150 is of importance in that this construction causes the shorter stalks of grain or other material to be cut, or stalks which have fallen over for various reasons, to be drawn into the cutting area which is described infra.

Figure 6 furnishes a clear illustration of link blades or cutters 156, which form a part of the link chain 90. The cutters 156 extend outwardly and downwardly from the chain in coacting relation with the plates 148 and cutting edges 154. The blades 156 are formed integrally with each alternate one of the links 92, and include perpendicular flanges 160 which extend therefrom as best seen in Figure 3. Integrally formed with the flange 160 is a downwardly inclined, substantially triangular blade 162 which is truncated at 164 and has a forward cutting edge 166 and an opposed edge 168 having an upwardly extending blade flange 170. A substantially cylindrical finger 172 extends from the flange 170 and, when the blade 156 is in the front of the machine, the finger 172 rides on top of the deck 20 but beneath the guard bars 152.

Figure 9 is illustrative of a modified form of blade denoted 156a including a link 92, flange 160a, blade 162a which is truncated at 164a, cutting edge 166a and opposed edge 168a with flange 170a, and finger 172a. The departure of the modification resides in the provision of longitudinally extending alternate lands 200 and grooves 202 which extend along the upper side of the blade 162a and thus cause the truncated end 164a to present a serrated leading edge. The utilization of the modified blade in the machine is identical to that described in regard to the blade 166.

Still another modified form of this invention is to be seen in Figure 10 wherein the blade is generally identified by reference character 156b and includes a link 92, flange 160b, and substantially flat blade 162b. Each of the blades 162b have truncated outer ends 164b as well as cutting edges 166b and opposed edges 168b having integral, substantially flat fingers 172b.

With further reference to Figure 10, another form of the combined guide and cutting member is also illustrated therein. The modified form 144a includes a substantially triangular main back member 300 which is suitably secured to adjacent pairs of the projections 43, and the back member has a sharpened cutting edge 302 confronting the cutting edges of the blades. A depending flange 304 is formed at the opposed end of the member 300 and an arcuate guard bar, formed of flat stock, extends inwardly therefrom and rearwardly over the deck 20.

When utilizing the present invention in the environment of a harvesting machine for grain or the like, and with the machinery assembled in the manner hereinbefore described and illustrated, and having the conventional reel (not shown) mounted thereon, the following operation results. The harvesting machine is propelled into the field of grain or other material to be cut and the reel is set at a much higher setting than is conventional and operates to tilt the taller grain towards the platform 10 of the machine. The shorter stalks of grain and those which may have fallen over are engaged by the leading ends of the guide 144 and the angular inclination of the aforesaid leading ends direct the grain, both short and tall stalks, rearwardly to a position wherein they are cut off by the scissors-like action of the cutting edge 166, 166a, or 166b, of the blades 156, 156a, or 156b and the cutting edges 154 or 302 of the guides 144 or 144a. The cut off stalks then fall rearwardly across the deck 20 and down the inclined wall 22 from whence they are conventionally withdrawn by action of the drum 14.

Should the link chain 90 become loosened during operation, additional tension may be applied thereto either by rotation of the screws 78 causing the plate 84 to exert additional pressure against the rollers 100, or by extending the distance between the lock nuts 114 (or their equivalent on the opposed side of the machine) and the side walls 24 or 26.

Having described and illustrated several embodiments of this invention, it will be understood that these embodiments are offered merely by way of illustration and that this invention be limited only by the scope of the appended claims.

What is claimed is:

1. Cutting mechanism for a harvesting machine comprising a mobile support, an elongated endless chain mounted on said support for movement in a substantially horizontal plane, a plurality of stationary plates on said support along one flight of said chain, each of said plates being provided with an outwardly and downwardly disposed cutting edge, and a plurality of cutters on said chain extending outwardly and downwardly therefrom in coacting relation to said plates and cutting edges.

2. Cutting mechanism for a harvesting machine as defined in claim 1 wherein each of said stationary plates includes a leading end portion, and a guard bar on each of said plates, said guard bars extending from said leading end portions at least to said support and being inclined upwardly and rearwardly from the end portions.

3. Cutting mechanism for a harvesting machine as defined in claim 2, and an elongated finger on each of said cutters, said fingers being adapted to be moved into coacting relation with said guard bars.

References Cited in the file of this patent

UNITED STATES PATENTS

| | | |
|---|---|---|
| 2,543,386 | Templeton | Feb. 27, 1951 |
| 2,624,999 | Goodnight | Jan. 13, 1953 |
| 2,748,535 | Skromme et al. | June 5, 1956 |
| 2,821,060 | Shoffner | Jan. 28, 1958 |
| 2,832,187 | Johnson | Apr. 29, 1958 |